Oct. 17, 1944.   G. HAGGLUND   2,360,672
SELF-FEEDING SOLDERING IRON
Filed Feb. 25, 1943
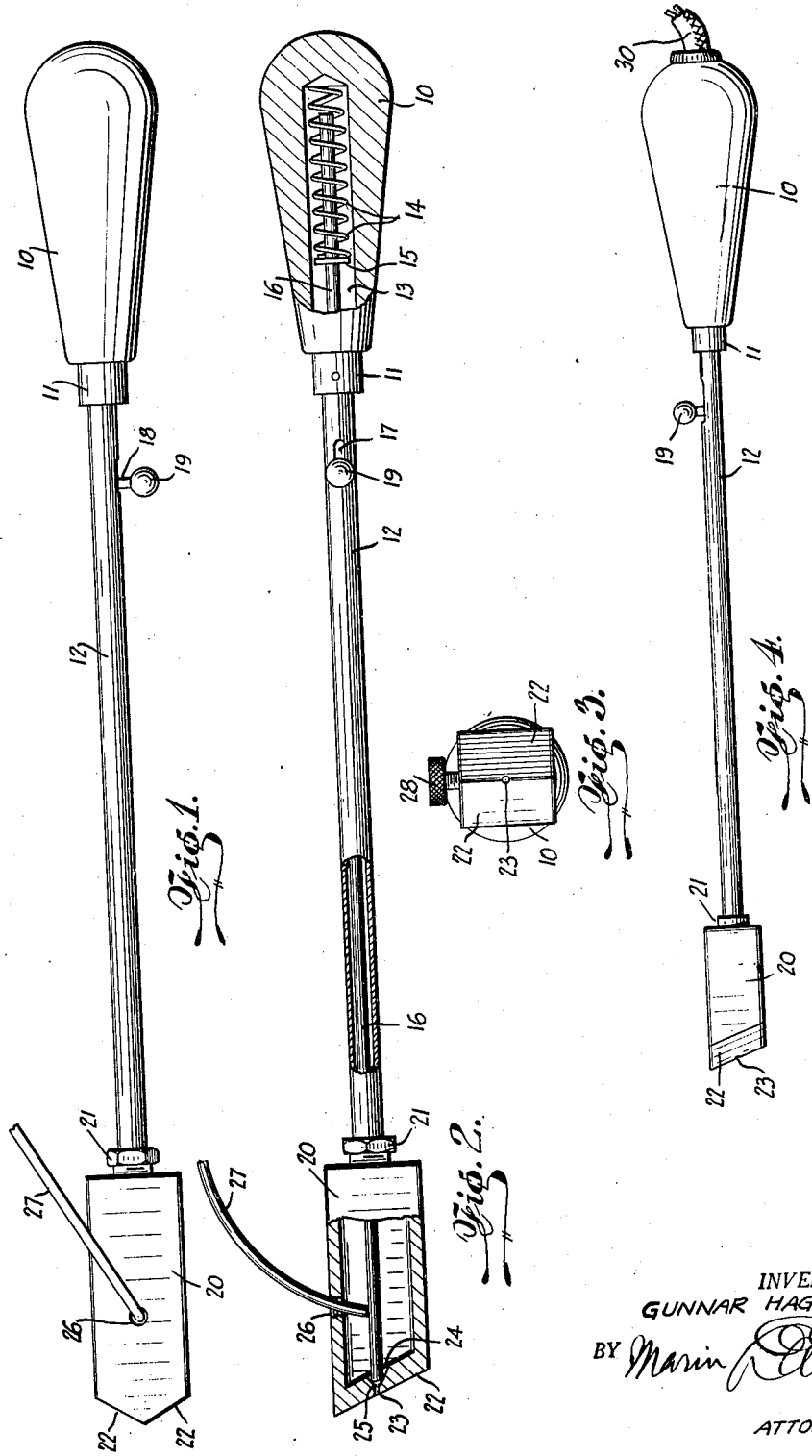
INVENTOR.
GUNNAR HAGGLUND.
BY
ATTORNEY.

Patented Oct. 17, 1944

2,360,672

UNITED STATES PATENT OFFICE 2,360,672

SELF-FEEDING SOLDERING IRON

Gunnar Hagglund, New York, N. Y.

Application February 25, 1943, Serial No. 477,099

1 Claim. (Cl. 113—109)

This invention relates to tools used in the application of soft solder to joints of metallic surfaces, for the purpose of making connections, stopping of leaks and other like uses.

An object of the invention is to provide a soldering device having means to contain a quantity of solder, in a fluid condition, combined with a valve to control the flow as may be required.

A further feature is in the provision of means for the inlet of solder, in strip form, to the melting chamber.

Another purpose is to produce a soldering tool which may be heated by an electrical current.

Finally to provide an efficient, yet simple tool of compact construction, convenient in operation and adapted for long continued service.

These objects are attained by the novel construction, combination and arrangement of parts, hereinafter described and shown in the annexed drawing, forming part of this disclosure, and in which—

Figure 1 is a side elevational view of an embodiment of the invention.

Figure 2 is a front view thereof, parts being in section to show the construction.

Figure 3 is an end view looking from the applicator end.

Figure 4 is a side view of a modified form of the device, as electrically heated.

As shown in the drawing, the device consists of a conical handle 10 having a ferrule 11 in which is firmly fixed a tube 12.

The handle is bored from its lower end to produce a closed container 13, in which is a helical spring 14, its upper end abutting the end of the bore, while its lower end presses against a washer 15 fixed on a rod 16 partially encircled by the spring.

A slot 17 permits longitudinal movement of a pin 18, passing therethrough, the pin being set in the rod 16, while its outer end is provided with an operating knob 19, by which the rod may be moved within the handle, against the spring.

The tube 12 is set rigidly in the closed end of a combined applicator and heating chamber 20 and clamped therein by a nut 21. The chamber is herein shown as rectangular, with any preferred shape at its lower applicator wall 22, adapted to distribute the solder.

In this wall is a discharge vent 23 having a valve seat 24, against which is thrust, by the spring 14, a valve plug 25 formed on the end of the rod.

An opening 26 is made in one of the side walls of the chamber for entrance of wire solder 27, this opening being screw-threaded to receive a closure plug 28, when the solder wire is withdrawn.

In operation, the chamber 20 is heated in any convenient manner and the solder-wire entered to become melted therein; when a sufficient quantity has been received, the wire is taken away and the hole 23 plugged by the screw 28; obviously upon sliding the knob 19 towards the handle, the vent 23 is opened and the molten solder will flow outward wherever it may be directed by an operator.

In the modified form, seen in Figure 4, the same general construction is employed, except that an insulated cable 30 conducts current through the handle 10, and tube 12, to resistances in the head 20, whereby sufficient heat is generated to melt the solder and cause it to flow through the vent 23, when uncovered by the valve 25.

Having thus described the invention and set forth the manner of its construction and application, what is claimed as new and sought to secure by Letters Patent is:

A soldering tool consisting of a tubular shank having a sleeve nut on the forward end thereof and a handle on the rear end thereof, the handle being formed with a longitudinal chamber disposed axially thereof, a valve rod extending through the tubular shank and forwardly of the sleeve nut thereof and also extending rearwardly of the tubular shank into the chamber of the handle, a compression spring on the rear end of said valve rod, a stop on said valve rod engaging said spring, said tubular shank having a longitudinal slot therein disposed forwardly of the handle and said valve rod having a pin extending through said longitudinal slot and providing means for shifting the valve rod in said shank against the tension of said spring, and a solder applying tool coupled to the sleeve nut and having a longitudinal chamber to hold a supply of solder, the forward end of the tool having a small solder discharge opening and also having an internal valve seat engaged by the forward end of the valve rod, and said spring normally maintaining pressure on said valve rod to close said seat, said tool also having a lateral opening through which a strip of solder may be fed into said supply chamber.

GUNNAR HAGGLUND.